March 17, 1925.  
W. E. McLAREN  
VEHICLE  
Filed April 16, 1924  
1,529,957  
2 Sheets-Sheet 2
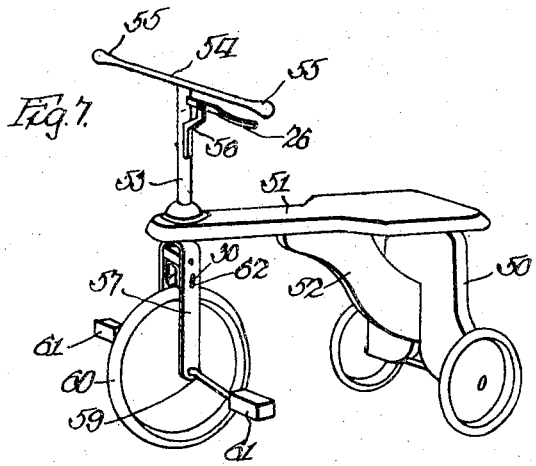
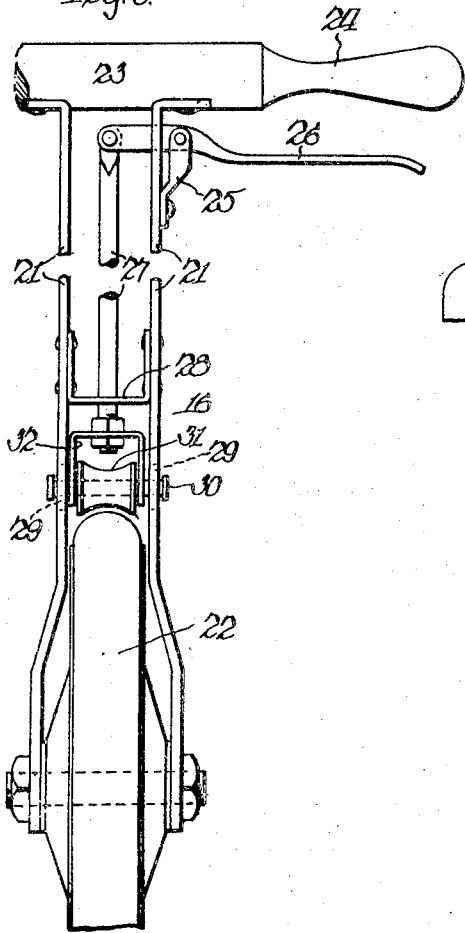
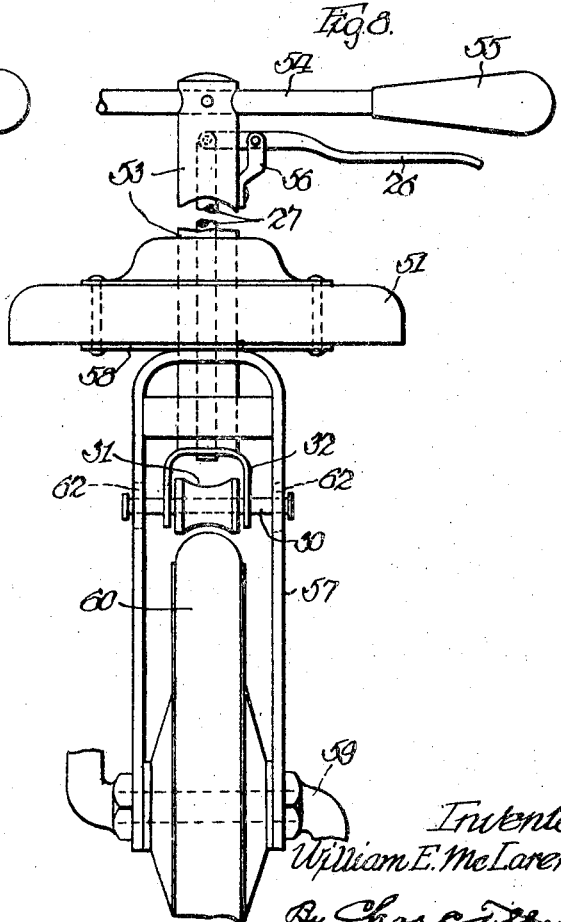
Inventor:  
William E. McLaren  
By Chas. C. Tillman  
Atty Patented Mar. 17, 1925.

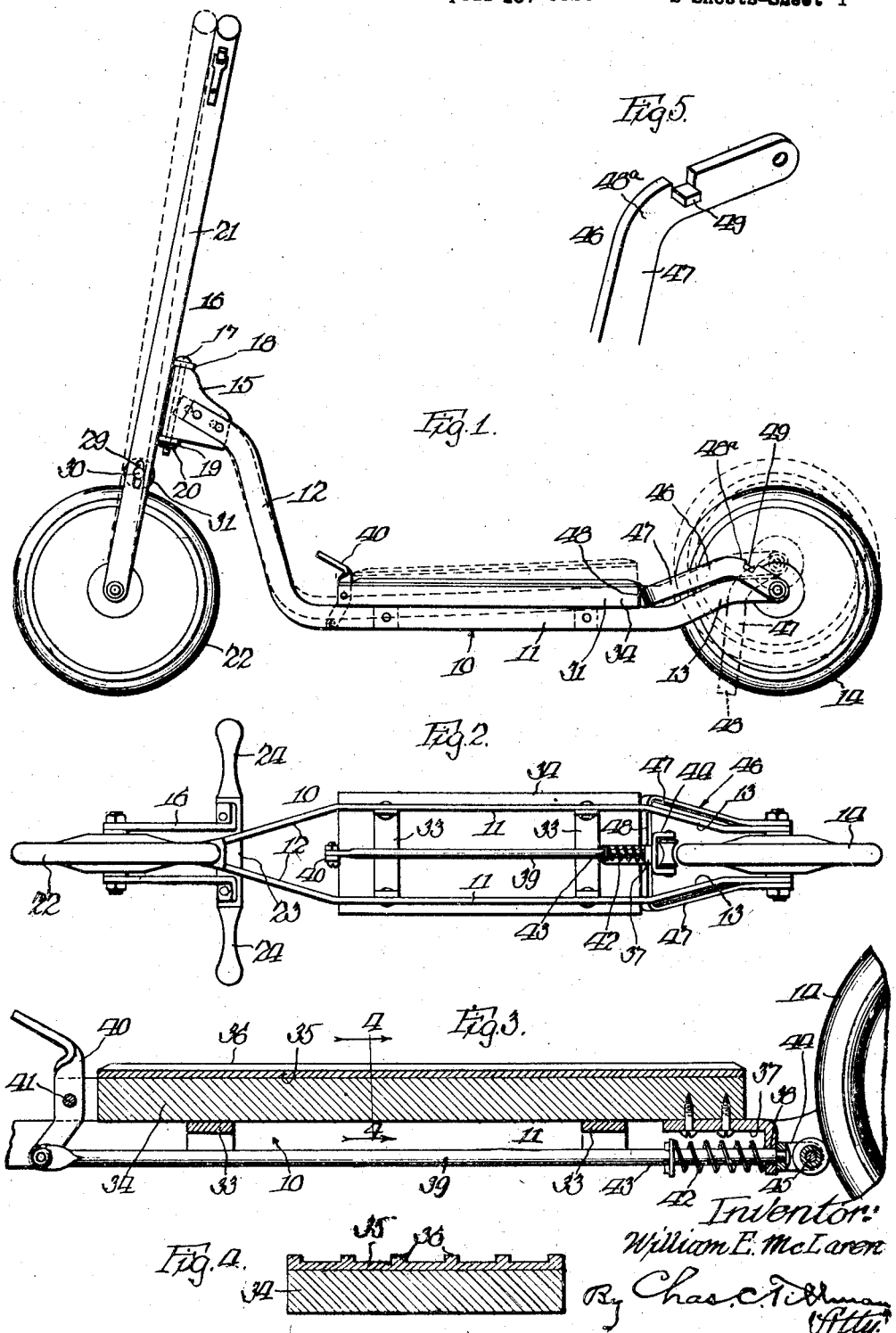

1,529,957

UNITED STATES PATENT OFFICE.

WILLIAM E. McLAREN, OF LOS ANGELES, CALIFORNIA.

VEHICLE.

Application filed April 16, 1924. Serial No. 706,820.

*To all whom it may concern:*

Be it known that I, WILLIAM E. McLAREN, a citizen of the United States, residing at Los Angeles, in the county of Los Angeles and State of California, have invented certain new and useful Improvements in Vehicles, of which the following is a specification.

This invention relates, generally, to improvements in vehicles, but has particular relation to that type of wheeled vehicles for use by children, commonly known as "scooters" and pedal or "kiddie" cars, wherein propulsion thereof is effected by placing one foot of the user on the foot rest board of the vehicle of the scooter type, and by thrusts in the proper direction on the ground of the other foot, and by applying power by means of the feet of the user to the pedals of the other type, and it consists in certain peculiarities of the construction, novel arrangement and combination of the various parts thereof as will be hereinafter more fully set forth and specifically claimed.

One of the objects of the invention is, the provision in a wheeled vehicle, of braking means therefor, of such construction, arrangement and co-operation of its parts with parts of the vehicle, that said means may be applied either by hand or foot manipulation, or by both, and in such a manner as to render abrupt stoppage of the vehicle impossible, thereby avoiding the possibility of the child or user being thrown violently forward and possibly from the vehicle and injured, yet so that a gradual but positive stopping or braking action will be attained.

It is another object of the invention to furnish simple and efficient means for preventing the foot of the user applied to the foot rest board of one form of the invention slipping in the operation of propelling the vehicle.

Still another object is, the provision of means for supporting the vehicle in an upright position while the same is at rest, which supporting means can be positioned, when idle, so as not to interfere with the operation of the vehicle or to detract from its appearance.

Other objects and advantages of the invention will become apparent from the following description and explanation, which will be more readily understood when read in conjunction with the accompanying drawings, which serve to illustrate embodiments of the invention, it being understood that modifications and changes may be resorted to without a departure from the spirit of the invention as expressed in the appended claims forming a part hereof.

Referring to the drawings,—

Fig. 1 is a view in side elevation of one form of the invention showing by dotted lines about the positions the parts thereof will assume when the vehicle is at rest and supported in an upright position by means of the improved support for such purpose.

Fig. 2 is a bottom plan view of the vehicle shown in Fig. 1.

Fig. 3 is a longitudinal section through the foot rest board showing a portion of the frame of the vehicle and the brake mechanism for co-operation with the rear wheel of the vehicle.

Fig. 4 is a cross-sectional view taken on line 4—4 of Fig. 3 looking in the direction indicated by the arrows.

Fig. 5 is an enlarged perspective view of a portion of the support employed for holding the vehicle in an upright position.

Fig. 6 is an enlarged view in elevation of parts of the front wheel and steering members of the vehicle of the construction shown in Fig. 1, illustrating a braking mechanism mounted thereon for co-operation with the front wheel.

Fig. 7 is a perspective view illustrating a modification in the construction of the vehicle showing the application of the brake for its front or steering wheel, and Fig. 8 is an enlarged view in front elevation of the same.

Corresponding numerals of reference refer to like parts throughout the different views of the drawing.

Referring now more particularly to Figs. 1 to 6 inclusive, the reference numeral 10 designates as a whole the frame of the vehicle, which as shown in Figs. 1 and 2 comprises a pair of spaced parallel bars 11 which have their front portions upturned and approximated or inclined towards each other as at 12 and their rear portions slightly upturned or rearwardly inclined as at 13, see Figs. 1 and 2 of the drawings. The rear wheel 14 of the vehicle is suitably journaled between the rear ends of the members 11 of the frame and said wheel is by preference equipped with a rubber tire of any desired kind.

The front ends of the bars 11 of the main frame of the vehicle are secured to a head 15, which head is pivotally connected to the upright steering member designated as a whole by the numeral 16 by means of a pivot rod 17 extended through openings in rearwardly extended projections 18 and 19 on the steering member 16 and through a suitable opening in the head 15, which rod can be held in position by means of a nut 20 threaded on its lower portion. The steering member 16 includes a pair of parallel bars 21 which are spaced and have their lower portions downwardly and outwardly deflected, see Fig. 6, so as to stride the front wheel 22 of the vehicle and so as to embrace its hub portion which is suitably journaled in the lower ends of the bars 21 constituting the steering member of the vehicle. The wheel 22, like the wheel 14, is by preference provided with a rubber tire. The upper end of the bars 21 have transversely mounted thereon in any suitable way a handle 23 provided with a gripping portion 24 near each of its ends.

Just below the handle 23, one of the bars 21 has mounted on its outer surface an upwardly extended bracket 25 to which is pivotally secured between its ends a grip lever 26 which lies directly under the handle 23 and normally in substantial parallelism therewith. This lever has its inner portion extended through an opening in one of the bars 21 of the steering member 16 and has pivotally connected to its inner end the upper portion of a brake operating rod 27, see Fig. 6, which rod is extended downwardly between the bars 21 through an opening in a U-shaped guide member 28 secured to the inner surfaces of the bars 21 at a suitable distance above the front wheel 22 of the vehicle. Just above the upper part of the front wheel 22 each of the bars 21 is provided with a vertically disposed slot 29, see Fig. 1, which slots register with one another and are for the reception and operation of a shaft or axle 30 which is transversely and horizontally disposed in said slots and has mounted thereon a spool-shaped brake shoe or element 31 for co-operation with the front wheel of the vehicle.

The shaft or axle 30 for this brake shoe or element 31 is connected to the lower end of the brake rod 27 by means of an inverted U-shaped member or yoke 32 held in place on said rod by means of clamping nuts or otherwise. By means of which nuts it is evident the yoke 32 and shoe 31 can be adjusted with respect to the wheel 22, to compensate for wear of said wheel and shoe.

By the foregoing arrangement of the parts, it is manifest that by pressing the lever 26 towards the handle 23, the rod 27 will be moved downwardly through its guide member 28, thus causing the rotatable brake shoe 31 to contact with the wheel 22 with a degree of pressure sufficient to gradually stop the movement of the vehicle. As the brake shoe or member 31 is rotatably mounted, and as the wheel is also rotatably mounted, it is obvious that their co-action or co-operation will create a very desirable means for braking or stopping the machine, as it makes it impossible for the brake to be applied so as to stop the vehicle abruptly, which might cause the user to be thrown forwardly and possibly injured. Besides avoiding this objection, it is apparent that the action of the brake is such as to graduate the stoppage of the vehicle but in a positive way.

Mounted on the upper surface of the parallel portions of the frame 10 and their brace bars 33 which connect them together transversely, is the foot rest board 34 which is provided on its surface with a mat or covering 35 which is by preference made of rubber or some other suitable slightly resilient material and has a series of spaced longitudinally extending ribs 36 on its upper surface. This mat or covering 35 is by preference co-extensive in its dimensions with that of the board 34 and is employed for preventing or rendering less liable slipping of the foot of the user of the vehicle which rests on said mat when riding or propelling the vehicle. At its rear end and about midway between the bars 11 the board 34 has secured to its lower surface a depending bracket 37 which has an opening 38 for the reception and operation of a brake rod 39 located at one of its ends in said opening and extended horizontally and longitudinally beneath the board 34. This rod has its front end pivotally connected to a foot lever 40 which is somewhat of the form of a bell crank lever and is fulcrumed between its ends on a pivot 41 mounted in the front end of the foot rest board about midway between the front portion of the parallel parts 11 of the main frame of the vehicle. The foot lever 40 extends above the board 34 and its mat 35 and is held in its normal position as shown in Figs. 1 and 3 by means of a coil spring 42 located around the rod 39 at its rear portion and has one of its ends in contact with the depending bracket 37 and its other end resting against a collar 43 fixed to the rod 39 at a suitable distance forwardly of said bracket.

Mounted on the rear end of the rod 39 is a U-shaped yoke 44 between the prongs of which is rotatably located a spool-shaped brake shoe 45 to contact with the rear wheel 14 when desired. In order to cause the brake shoe 45 to contact with the wheel 14, it is obvious that by applying pressure to the foot lever 40 and forcing the upper end of said lever forwardly, the rod 39 will be moved longitudinally and rearwardly against the tension of the spring 43 a sufficient distance to permit the roller 45 to impinge against the tire of the wheel 14 and as both of these members revolve, it is obvious that abrupt stoppage of the vehicle will be prevented but a gradual and positive stoppage will be effected.

In order to provide means for holding the vehicle in an upright position while the same is at rest, I employ a stirrup or loop member generally designated 46, see Fig. 2, having its ends pivotally connected to the shaft or axle of the rear wheel 14 and being of sufficient size to straddle the said wheel without touching the same. As shown, the stirrup 46 has its side members 47 inclined from each other forwardly and connected together at their front portions by a crosspiece 48, which, when the member 46 is turned from the position shown by continuous lines in Fig. 1 to that illustrated by dotted lines in said figure, the cross-piece 48 will rest on the ground or floor forwardly of the axis of the wheel 14, thus forming a wide base for supporting said wheel out of contact with the floor and against lateral or tilting movement. An important feature of the supporting stirrup or member 46 is the provision of each of the side members 47 thereof with an elbow or upward bend 48$^a$ and between the apex of said elbow and the axle of the wheel 14 on which said side members are pivotally mounted, with an inturned or laterally extended lip 49, see Fig. 5, which lips, when the supporting stirrup 46 is turned to the dotted line position shown in Fig. 1, will engage the lower surfaces of the rearwardly and upturned portions 13 of the main frame of the vehicle, thus securely supporting said portion. By providing each of the side members 47 with the elbow or curved portion 48$^a$, it is manifest that the portion 48 thereof will be positioned so as to rest cross-wise of the frame 10 at the rear end of the foot board 34 as shown in Fig. 1, where it will offer no interference with the operation of the vehicle.

In Figs. 7 and 8 of the drawings I have shown a modification in the construction of the vehicle which consists in the employment of what is commonly known as a kiddie pedal car. This car or vehicle is of the three-wheel type and has a bolster 50 extended upwardly from its rear axle and is provided with a seat board 51 extended forwardly and horizontally from the upper portion of the bolster 50 and suitably supported by a brace member 52 connected at its rear end to the bolster and at its front or upper portion to the bottom of the seat board. The front portion of the seat board 51 has vertically journaled therein a tubular steering member 53 which carries at its upper end a transversely disposed handle 54 having at each of its ends a gripping portion 55. The member or post 53 has mounted directly under the handle 54 an upwardly extended bracket 56, to which is pivotally secured between its ends a gripping lever 26 which is extended through a slot or opening in the member 53 and is pivotally connected at its inner end to a brake rod 27 which is extended downwardly through the member 53 and has mounted on its lower end an inverted U-shaped yoke 32.

The member 53 is also extended through an opening in the upper portion of an inverted U-shaped yoke 57 which rests at its upper end against a bearing plate 58 on the lower surface of the seat board 51. This yoke 57 has transversely journaled in the lower portion of its depending side members a crank shaft 59 which serves as an axle for the front wheel 60 of the modified form of vehicle now under consideration, and is equipped with a pedal 61 on each side of the wheel 60 for employment by the user of his feet in propelling the vehicle.

Each of the side members of the yoke 57 is provided just above the top of the wheel 60 with a vertically disposed slot 62, which slots register with one another and are for the reception and operation of a shaft or axle 30 carried by the yoke 32. This shaft or axle has mounted thereon between the side members of the yoke 32 a spool-shaped brake shoe or member 31 which is adapted for co-action with the wheel 60 in a manner similar to that shown in Figs. 2 and 6 with the wheel 22 and above described.

From the foregoing and by reference to the drawings it will be readily understood and clearly seen that by my improvements a very simple, inexpensive and efficient vehicle of the class described is provided, in which the user may apply braking pressure to one or two of the wheels thereof in such a way that the abrupt stoppage of the vehicle will be avoided, yet a gradual stoppage thereof will be effected.

It is further obvious that a means for supporting a vehicle of the scooter type in an upright position is afforded, which means is simple in operation yet very effective.

Having thus fully described my invention, what I claim as new and desire to secure by Letters Patent is:

1. In a child's vehicle, a wheel supported body rest, a head at one end of said rest having an aperture therein, a steering member comprising a pair of spaced upright bars, a pair of apertured projections carried by and extending from said bars and located one above and the other below said head, a pin passing through said apertured projections and head for detachably and pivotally uniting them, a rod carried by and between said bars for longitudinal movement with respect thereto, a lever fulcrumed on one of said bars and extended at one of its ends to a point between them and connected at said end to the upper end of the rod, a yoke adjustably mounted on the lower extremity of said rod, and a brake shoe or member rotatably mounted in said yoke and vertically guided by said steering member for detachable engagement with the steering wheel of the vehicle.

2. In a child's vehicle of the class described, the combination with a tandem wheeled main frame having upturned portions at its front and rear ends and provided with a horizontally disposed foot rest between said ends, of a vertically disposed and apertured head fixedly mounted on the upper portion of the upwardly extended front end of said frame, a steering member for one of said wheels comprising a pair of spaced upright bars having a pair of apertured projections located one above and the other below said head, a pivot located in the openings of said projections and head for detachably and pivotally uniting them, a rod carried by and between said bars for longitudinal movement with respect thereto, a lever fulcrumed on one of said bars and extended at one of its ends to a point between them and connected at said end to the upper end of the rod, a yoke adjustably mounted on the lower extremity of said rod, and a brake shoe or member rotatably mounted in said yoke and vertically guided by said steering member for detachable engagement with the steering wheel of the vehicle.

WILLIAM E. McLAREN.